United States Patent [19]

Kanaida et al.

[11] Patent Number: 5,587,410
[45] Date of Patent: Dec. 24, 1996

[54] AQUEOUS RESIN COMPOSITION

[75] Inventors: Kenta Kanaida, Takatsuki; Kiyoshi Kawamura, Kawanishi, both of Japan

[73] Assignee: Nippon Shokubai Co., Ltd., Osaka, Japan

[21] Appl. No.: 417,615

[22] Filed: Apr. 5, 1995

[30] Foreign Application Priority Data

Apr. 7, 1994 [JP] Japan .................. 6-069383

[51] Int. Cl.$^6$ ................................ C08L 63/08
[52] U.S. Cl. .................. 523/410; 427/400; 428/516; 524/808; 525/329.5
[58] Field of Search ............ 523/410; 525/329.5; 524/808; 427/400; 428/516

[56] References Cited

U.S. PATENT DOCUMENTS 4,474,923  10/1984  Keskey et al. ..................... 524/458
4,508,869  4/1985  Keskey et al. ..................... 524/808
4,631,233  12/1986  Kan ..................................... 428/420

FOREIGN PATENT DOCUMENTS

| 0146965 | 7/1985 | European Pat. Off. . |
| 0176609 | 4/1986 | European Pat. Off. . |
| 61-89217 | 5/1986 | Japan . |
| 63-48884 | 10/1988 | Japan . |
| 1245041 | 9/1989 | Japan . |
| 1272670 | 10/1989 | Japan . |
| 260941 | 3/1990 | Japan . |
| 299537 | 4/1990 | Japan . |
| 639548 | 5/1994 | Japan . |

*Primary Examiner*—Melvyn I. Marquis
*Assistant Examiner*—D. Aylward
*Attorney, Agent, or Firm*—Roylance, Abrams, Berdo & Goodman, L.L.P.

[57] ABSTRACT

An aqueous resin composition includes a polymer and an aqueous medium, wherein the polymer at least partially includes a polyolefin chloride resin and has a carboxyl group and an oxazoline group.

7 Claims, No Drawings

AQUEOUS RESIN COMPOSITION

BACKGROUND OF THE INVENTION

1. Technical Field

The present invention relates to an aqueous resin composition, particularly an aqueous resin composition which is useful for coatings, primers, adhesives, printing ink, and the like.

2. Background Art

A polyolefin chloride resin has excellent adhesion particularly to polyolefin resins, such as polypropylene and ethylene-propylene copolymers, and further has excellent solvent-resistance. So the polyolefin chloride resin is widely used for the purpose of protecting surfaces of plastics. Conventional methods for coating the polyolefin chloride resin include using a coating solution in which a polyolefin chloride is dissolved in an organic solvent. However, considering environmental influence, working environment, safety, and so on, there have recently been proposed polyolefin chloride-containing water dispersions in which polyolefin chloride-containing resins are dispersed in water. Japanese Official Patent Provisional Publication (Kokai) No. Heisei 1-245041 discloses an aqueous composition including an alkenylbenzene polymer and a polyolefin chloride. This aqueous composition is obtained by forcibly dispersing the polyolefin chloride into an aqueous medium, in which the alkenylbenzene polymer is dispersed, or by polymerizing the alkenylbenzene polymer and the like in an aqueous medium in the presence of the polyolefin chloride. In addition, Japanese Official Patent Provisional Publication (Kokai) No. Heisei 1-272670 discloses an aqueous composition including a carboxyl group-containing resin composition and a polyolefin chloride.

As to the aqueous composition disclosed in Japanese Official Patent Provisional Publication (Kokai) No. Heisei 1-272670, because of the use of the carboxyl group-containing resin composition, the dispersibility of the polyolefin chloride in the aqueous composition is improved when compared with that disclosed in Japanese Official Patent Provisional Publication (Kokai) No. Heisei 1-245041. However, any coating film obtained from these aqueous compositions provides poor results with regard to adhesion, water resistance, and solvent resistance, so these aqueous compositions are only utilized for limited uses.

In technical fields different from that which an aqueous composition containing a polyolefin chloride pertains to, it is known that a composition containing an acrylic resin or an urethane resin is used to improve the adhesion with substrates. For example, Japanese Official Patent Gazette (Kokoku) No. Showa 63-48884 discloses that an acrylic resin having a carboxyl group and a polymer containing an oxazoline are used. Japanese Official Patent Gazette (Kokoku) No. Heisei 6-39548 discloses that an urethane resin having a carboxyi group and a polymer containing an oxazoline are used. However, there is a problem that, even if these compositions are coated on substrates including polyolefin resins, the adhesion is not sufficient.

SUMMARY OF THE INVENTION

Object of the Invention

It is an object of the present invention to provide an aqueous resin composition which can form a coating film that has excellent adhesion to substrates, especially o polyolefin and so on, and excellent water resistance, solvent resistance and so on, the composition being useful for coatings, primers, adhesives, printing ink, and the like.

Disclosure of the Invention

An aqueous resin composition of the present invention includes a polymer blend and an aqueous medium, wherein the polymer at least partially includes a polyolefin chloride resin and has a carboxyl group and an oxazoline group.

DETAILED DISCLOSURE OF THE INVENTION

An aqueous resin composition of the present invention includes a polymer blend and an aqueous medium, wherein the polymer at least partially includes a polyolefin chloride resin and has a carboxyl group and an oxazoline group.

The above-mentioned polymer blend preferably includes: a polymer (A1) at least partially including a polyolefin chloride resin and having a carboxyl group; and a polymer (B) having an oxazoline group.

The above-mentioned polymer preferably includes: a polymer (A1) at least partially including a polyolefin chloride resin and having a carboxyl group; an aqueous resin having a carboxyl group; and a polymer (B) having an oxazoline group.

The ratio by weight of the polymer (A1) having a carboxyl group to the polymer (B) having an oxazoline group, (A1)/(B), is preferably in a range of 0.2 to 50.

The acid value of the polymer having a carboxyl group is preferably in a range of 5 to 200 mgKOH/g.

The above-mentioned polymer blend preferably includes: a polymer (A2) at least partially including a polyolefin chloride resin and having no carboxyl group; an aqueous resin having a carboxyl group; and a polymer (B) having an oxazoline group.

The ratio by weight of the polymer (A2) having no carboxyl group to the polymer (B) having an oxazoline group, (A2)/(B), is preferably in a range of 0.2 to 50.

The content of the polyolefin chloride resin in the polymer at least partially including the polyolefin chloride resin is preferably in a range of 10 to 100% by weight.

The polymer having an oxazoline group is preferably a copolymer obtained by copolymerizing an addition-polymerizable oxazoline and a vinyl monomer, and the copolymerization ratio of the addition-polymerizable oxazoline is preferably not less than 0.5% by weight, but less than 50% by weight.

The aqueous resin composition of the present invention is preferably formable into a coating film by being coated on a substrate including a polyolefin resin.

A polymer blend, contained in the aqueous resin composition of the present invention, at least partially includes a polyolefin chloride resin and has a carboxyl group and an oxazoline group.

This polymer blend includes: a polymer (A1) at least partially including a polyolefin chloride resin (a) and having a carboxyl group; and a polymer (B) having an oxazoline group.

Another polymer includes: a polymer (A1) at least partially including a polyolefin chloride resin (a) and having a carboxyl group; an aqueous resin (C1)having a carboxyl group; and a polymer (B) having an oxazoline group.

Furthermore another polymer blend includes: a polymer (A2) at least partially including a polyolefin chloride resin (a) and having no carboxyl group; an aqueous resin (C1)

having a carboxyl group; and a polymer (B) having an oxazoline group.

Polymers (A1) and (A2)

Any of the above-mentioned polymers (A1) and (A2) is a polymer at least partially including a polyolefin chloride resin (a). As to the polyolefin chloride resin (a), for example, there can be employed those obtained by chloridizing polyolefins, such as polyethylene, polypropylene, ethylene-propylene copolymers, ethylene-propylene-diene copolymers, polybulene, ethylene-vinyl acetate copolymers, styrene-butadiene copolymers, styrene-isoprene copolymers, natural rubber, and olefin rubber, by utilizing conventional methods. In addition, as to the polyolefin chloride resin (a), there can also be used polyolefins modified by introducing a carboxyl group, a hydroxyl group, an acid anhydride group and the like.

The polyolefin chloride resin (a) included in the polymer (A1) may be a polyolefin chloride resin modified by introducing a carboxyl group. In this case, the polymer (A1) may include no polymer having a carboxyl group other than the polyolefin chloride resin modified by introducing a carboxyl group. However, it is preferable that the polymer (A1) further includes another polymer having a carboxyl group, because the water resistance and the solvent resistance of the coating film obtained from the aqueous resin composition are improved.

The chloridization of polyolefins can, for example, be carried out by dissolving or dispersing the polyolefins into appropriate solvents and then reacting the polyolefins with a chlorine gas. In such a process, in order to allow the reaction to smoothly progress, ultraviolet or visible rays may be irradiated to the reaction mixture, or radical polymerization initiators may be used.

In addition, the polyolefin chloride resins (a) further includes modified polyolefin chlorides obtained by modifying the above-mentioned polyolefin chlorides with maleic anhydride and the like.

Examples of commercially obtainable polyolefin chloride resins (a) are those having trade names "Superchlon" (made by Sanyo-Kokusaku Pulp Co., Ltd.), "Hardlen" (made by Toyo Kasei Kogyo Co., Ltd.). These polyolefin chloride resins (a) may be used either alone or in combinations with each other.

The polymer (A1) includes the polyolefin chloride resin (a), and of the polyolefin chloride resins (a), that modified by introducing a carboxyl group may be used alone as the polymer (A1). In addition, the polymer (A2) includes the polyolefin chloride resin (a), and of the polyolefin chloride resins (a), that having no carboxyl group may be used alone as the polymer (A2). Or otherwise, the polyolefin chloride resin (a) may be used as the polymer (A1) or (A2) in combinations with other polymers (a'), such as vinyl polymers (other than the polyolefin chloride resin (a)), polyesters, polyethers, polyamides and polyamines.

Any of the polymers (A1) and (A2) is preferably used in form of a dispersion obtained by dispersing the polymer (A1) or (A2) into the later-mentioned aqueous medium, by reasons of good handling properties and so on. A method for dispersing any one of the polymers (A1) and (A2) into the later-mentioned aqueous medium is not especially limited, and conventional methods can widely be employed. Examples of the dispersing methods are as follows: a method wherein a solution of the polyolefin chloride resin (a) in a solvent, or a mixture of this solution with another polymer, is dispersed into an aqueous medium, favorably in the presence of an emulsifier or dispersant; a method wherein a vinyl monomer containing an acid anhydride group or carboxyl group is polymerized in the presence of the polyolefin chloride resin (a), a basic compound is added to the resultant resin mixture, and then the resultant mixture is dispersed into an aqueous medium; and a method wherein a vinyl monomer in which the polyolefin chloride resin (a) is dissolved is emulsion-polymerized or suspension-polymerized in an aqueous medium.

It is preferable that the polymer (A1) having a carboxyl group is used as a component constituting the aqueous resin composition of the present invention, because the adhesion, the water resistance and the solvent resistance of the coating film obtained from the aqueous resin composition are improved and because the stability of the aforementioned dispersion is also improved. The polymer (A1) is not especially limited and, for example, there may be used the following polymers: the aforementioned polyolefin chloride resin (a) containing at least one of a carboxyl group and an acid anhydride group; and polymers obtained by the following methods: a method wherein a polymer having a carboxyl group is dispersed together with the polyolefin chloride resin (a) into an aqueous medium; a method wherein the polyolefin chloride resin (a) is dissolved into a carboxyl group-containing monomer, and then the resultant solution is dispersed into an aqueous medium to carry out polymerization; a method wherein the polyolefin chloride resin (a) is dispersed in the presence of a carboxyl group-containing water-soluble polymer as a dispersant; and so on. The carboxyl group content of the polymer (A1) is favorably in a range of 5 to 200 mgKOH/g in terms of acid value.

If the polymer (A2) having no carboxyl group is used as a component of the aqueous resin composition together with the later-mentioned aqueous resin (C1) having a carboxyl group, there is obtained the same performance as the use of the polymer (A1).

In addition, the polymer (A 1) having a carboxyl group may be used as a component of the aqueous resin composition together with the later-mentioned aqueous resin (C1) having a carboxyl group, and this case is preferable, because the adhesion, the water resistance and the solvent resistance of the coating film obtained from the aqueous resin composition are more improved.

The content of the polyolefin chloride resin (a) in the polymers (A1) and (A2) is favorably in a range of 10 to 100% by weight. In the case where the content of the polyolefin chloride resin (a) is less than 10% by weight, the adhesion unfavorably tends to be damaged.

Polymer (B) Having Oxazoline Group

The polymer (B) having an oxazoline group, used in the present invention, is a polymer having at least one oxazoline group on its side chain, and typically is a polymer obtained by polymerizing a monomer component including an addition-polymerizable oxazoline (b-1) and, if necessary, one or more kinds of other monomers (b-2). The number-average molecular weight of the polymer (B) is favorably 1,000 or more.

In the present invention, the addition-polymerizable oxazoline (b-1) is shown by the following general formula (I):

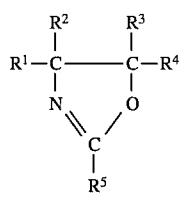

$$\begin{array}{c} R^2 \quad R^3 \\ | \quad | \\ R^1-C-\!\!-\!\!-\!\!-C-R^4 \\ | \quad | \\ N \quad O \\ \diagdown \diagup \\ C \\ | \\ R^5 \end{array} \quad (I)$$

where: each of $R^1$, $R^2$, $R^3$, and $R^4$ independently denotes a hydrogen atom, a halogen atom, an alkyl group, an aralkyl group, a phenyl group, or a substituted phenyl group; and $R^5$ denotes an acyclic organic group having an addition-polymerizable unsaturated bond.

Practical examples of the addition-polymerizable oxazoline (b-1) are 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and the like. These compounds may be used either alone or in combinations with each other. Particularly 2-isopropenyl-2-oxazoline is favorable, because it is industrially obtainable with easiness.

Although the amount of the addition-polymerizable oxazoline (b-1) used in the present invention is not especially limited, it is desirably not smaller than 0.5% by weight, but smaller than 50% by weight. In the case where the amount is smaller than 0.5% by weight, the adhesion, the water resistance and the solvent resistance of the coating film obtained from the aqueous resin composition are not sufficient. And, even if 50% by weight or more of the addition-polymerizable oxazoline (b-1) is used, the level of adhesion is not enhanced any more, so it is economically disadvantageous.

The addition-polymerizable compound (b-2) used in the present invention is not especially limited so long as it is a monomer copolymerizable with the addition-polymerizable oxazoline (b-1). Its examples are as follows: (meth)acrylic acid esters, such as methyl (meth) acrylate, butyl (meth)acrylate, and 2-ethylhexyl (meth)acrylate; polyfunctional (meth)acrylates having two or more polymerizable unsaturated groups in their molecules, such as esters of (meth)acrylic acid with polyvalent alcohols, such as ethylene glycol, butylene glycol, diethylene glycol, 1,6-hexane glycol, neopentyl glycol, polyethylene glycol, trimethylolpropane, and pentaerythritol; unsaturated nitriles, such as (meth)acrylonitrile; unsaturated amides, such as (meth)acrylamide and N-methylol(meth)acrylamide; vinyl esters, such as vinyl acetate and vinyl propionate; vinyl ethers, such as methyl vinyl ether and ethyl vinyl ether; α-olefins, such as ethylene and propylene; halogen-containing α, β-unsaturated monomers, such as vinyl chloride, vinylidene chloride, and vinyl fluoride; α,β-unsaturated aromatic monomers, such as styrene and α-methylstyrene. These compounds may be used either alone or in combinations with each other.

The polymer (B) having an oxazoline group is preferably used in form of a dispersion by reasons of its good handling properties and so on, similarly to the polymers (A1) and (A2). In order to disperse the polymer (B) into the later-mentioned aqueous medium, various methods are employed, and typically the dispersion can be achieved by carrying out conventional emulsion polymerization or suspension polymerization of the addition-polymerizable oxazoline (b-1) and, if necessary, one or more kinds of other monomers (b-2) in an aqueous medium. There may also be employed other methods, for example, a method wherein the polymer (B) produced by conventional polymerization methods is after-dispersed into an aqueous medium, if necessary using an emulsifier or dispersant.

Aqueous Resin (C)

The aqueous resin composition of the present invention, as occasion demands, may further contain an aqueous resin (C). In addition, the aqueous resin (C) does not include any of the polymers (A1), (A2) and (B). As to the aqueous resin (C), there can be used various conventional ones, for example: water-dispersible or water-soluble acrylic resins, such as products of the trade names "Acryset" and "Arolon", both of which are made by Nippon Shokubai Co., Ltd.; water-dispersible polyurethanes, such as products of the trade names "Hydran" (made by Dainippon Ink & Chemicals, Inc.), "Vondic" (made by Dainippon Ink & Chemicals, Inc.), "Superflex" (made by Dai-ichi Kogyo Seiyaku Co., Ltd.), and "NeoRez" (made by Zeneca Resins Co., Ltd.); water-dispersible polyesters, such as products of the trade names "Vylonal" (made by Toyobo Co., Ltd.), and "Finetex" (made by Dainippon Ink & Chemicals, Inc.); water-dispersible, water-dilutable or water-soluble alkyd resins, such as a product of the trade name "Hols" (made by Kansai Paint Co., Ltd.); water-dispersible, water-dilutable or water-soluble polyolefin resins, such as products of the trade names "Isobam" (made by Kuraray Co., Ltd.), "Primacor" (made by The Dow Chemical Company), and "Hytec" (made by Toho Chemical Industry Co.,Ltd.); water-dispersible epoxy resins, such as a product of the trade name "Epiclon" (made by Dainippon Ink & Chemicals, Inc.); vinyl chloride emulsions; and so on.

Of the above-mentioned aqueous resins (C), an aqueous resin (C1) having a carboxyl group is preferable. Examples of the aqueous resin (C1) are water-dispersible or water-soluble acrylic resins. In the case where the polymer (A2) is used, the aqueous resin (C1) is an essential component. In addition, in the case where the polymer (A1) is used, it is preferable that the aqueous resin composition further contains the aqueous resin (C1), because the adhesion, the water resistance and the solvent resistance of the coating film obtained from the aqueous resin composition are improved.

In the present invention, the combination ratio of the polymer (A1) or (A2) to the aqueous resin (C) is preferably in a range of 0.2 to 50 in terms of the weight ratio (A1)/(C) or (A2)/(C). In the case where the weight ratio is less than 0.2, the adhesion of the resultant coating film tends to be low. And, in the case where the weight ratio is more than 50, the water resistance and the solvent resistance of the resultant coating film tend to be low.

Aqueous Medium

The aqueous medium used in the present invention means water or a mixture of water with a hydrophilic organic solvent. The usable hydrophilic organic solvent is not especially limited so long as it is compatible with water. For example, it is at least one selected from the group consisting of methanol, ethanol, propanol, isopropanol, butanol, tertiary butanoL, ethylene glycol, ethylene glycol monomethyl ether, ethylene glycol monobutyl ether, diethylene glycol, acetone, and methyl elhyl ketone.

Additive

The aqueous resin composition of the present invention, as occasion demands, may further contain as an additive a compound having two or more functional groups reactive to an oxazoline group, for example, the following compounds: aliphatic polymercapto compounds, such as 2,3-dimercapto-1-propanol, 1,6-dimercaptohexane, dimercaptodiethyl ether, and 2,2-dimercaptodiethyl sulfide; aromatic polymercapto compounds, such as 3,4-dimercaptotoluene, bis(4-mercaptophenyl) sulfide, 4-tertiary-butyl-1,2-benzenedithiol, 1,5- or 2,7-dimercaptonaphthalene, and 2,5-dimercapto-1, 3,4-thiadiazole; triazinethiol compounds, represented by 2,4-dimercapto-6-R-1,3,5-triazine, wherein R denotes $NHR^1$, $NR^2R^3$, $OR^4$, or $SR^5$ wherein $R^1$, $R^2$, $R^3$, $R^4$, and $R^5$ denote a hydrogen atom or a hydrocarbon-residue group, such as 2,4-dimercapto-6-dibutylamino-1,3,5-triazine, 2,4,6-trimercapto-1,3,5-triazine, and 2,4-dimercapto-6-phenylamino-1, 3,5-triazine; aliphatic polycarboxylic acid compounds, such as oxalic acid, malonic acid, succinic acid, adipic acid, and sebacic acid; unsaturated polycarboxylic acid compounds, such as maleic acid and fumatic acid; aromatic polycarboxylic acid compounds, such as phthalic acid, telephthalic acid, diphenylmethane dicarboxylic acid, and naphthalene dicarboxylic acid. These compounds may be used either alone or in combinations with each other.

The aqueous resin composition of the present invention, as occasion demands, may further contain appropriate additives, for example: plasticizers, such as phthalic acid esters and benzyl alcohol; fillers, such as calcium carbonate, talc, clay, and mica; pigments, such as carbon black, titanium white, zinc white, iron oxide red, and phthalocyanine; dyes; thickeners, such as polyvinyl alcohol, hydroxyethylcellulose, and starch; dispersants; humectants; defoaming agents, such as silicones.

Process for Producing Aqueous Resin Composition

An aqueous resin composition includes: a polymer (A1); a polymer (B) having an oxazoline group; and an aqueous medium.

Another aqueous resin composition includes: a polymer (A1); a polymer (B) having an oxazoline group; an aqueous resin (C1); and an aqueous medium.

Furthermore another aqueous resin composition includes: a polymer (A2); a polymer (B) having an oxazoline group; an aqueous resin (C1); and an aqueous medium.

These aqueous resin compositions can be produced by processes conventional in the art. For example, the compositions can be obtained by: 1) simply mixing a dispersion, in which the polymer (A1) or (A2) is dispersed in an aqueous medium, with another dispersion in which the polymer (B) having an oxazoline group is dispersed in an aqueous medium, these dispersions being obtained from the aforementioned procedures; and 2) further mixing the resultant mixture with the aqueous resin (C1), if necessary. In addition, the compositions can also be obtained by mixing the polymer (A1) or (A2) with the polymer (B) having an oxazoline group, and then dispersing the resultant mixture into an aqueous medium, if necessary together with the aqueous resin (C1). In addition, an aqueous resin (C) other than the aqueous resin (C1), and the aforementioned additives, may further be added to the resultant aqueous resin composition. In the present invention, the combination ratio of the polymer (A1) or (A2) to the polymer (B) having an oxazoline group is favorably in a range of 0.2 to 50 in terms of the weight ratio (A1)/(B) or (A2)/(B). In the case where the weight ratio is less than 0.2, the adhesion of the resultant coating film tends to be low. And, in the case where the weight ratio is more than 50, the water resistance and the solvent resistance of the resultant coating film tend to be low.

Utility of Aqueous Resin Composition

When the aqueous resin composition of the present invention, obtained in the above-mentioned way, is used for coatings, primers, adhesives, printing ink, and the like, it can be coated onto substrates by conventional methods utilizing coating means, such as roll coating, spraying, immersing, and brush coating. As to the substrates, for example, there can be used plastics, wood, paper, nonwoven fabrics, glass fibers, polyester fibers, metals, inorganic materials, and so on. The coating film obtained in the above-mentioned way has excellent adhesion, water resistance and solvent resistance.

It is especially preferable that the aqueous resin composition of the present invention is applied to substrates including polyolefin resins, because coating films obtained by coating the aqueous resin composition on the substrates have further excellent adhesion, water resistance and solvent resistance.

The dry film thickness of the coating films, obtained by coating the aqueous resin composition on the substrates including polyolefin resins, is preferably in a range of 5 to 200 µm in respect of the adhesion of the coating films.

The coating film is obtained by coating the aqueous resin composition on a substrate and then baking the coated composition. The baking is favorably carried out using heaters, such as driers, under conditions where the baking temperature is in a range of 40° to 150° C., preferably 60° to 150° C., and where the baking period is in a range of 5 to 60 minutes, because coating films are efficiently obtained under these conditions.

The aqueous resin composition of the present invention contains a polymer at least partially including a polyolefin chloride resin and having a carboxyl group and an oxazoline group. Since the polyolefin chloride resin has high affinity with polyolefin resins, if the aqueous resin composition is especially coated on substrates including polyolefin resins, the resultant films have high adhesion with the substrates. In addition, the above-mentioned polymer has a carboxyl group and an oxazoline group, and this polymer forms a crosslinked structure due to chemical reactions of these functional groups during the formation of films, so the films obtained by coating the aqueous resin composition on substrates have high water resistance and high solvent resistance.

BEST MODE FOR CARRYING OUT THE INVENTION

Hereinafter, the present invention is illustrated by the following examples of some preferred embodiments in comparison with comparative examples not according to the invention. However, the present invention is not limited to these examples. In addition, in the examples, unless otherwise noted, the units % and part are by weight.

PRODUCTION EXAMPLE 1

A Production Example for Water Dispersion of Polymer (A1)

A mixture of 250 of "Superchlon 832L" (a polypropylene chloride resin made by Sanyo-Kokusaku Pulp Co., Ltd.; 30% toluene solution; chlorine content 27% ), 5 parts of "Epikote 828" (an epoxy resin made by Yuka Shell epoxy Kabushiki Kaisha) and 5 parts of "NK ester M-230G" (methoxypolyethylene glycol methacrylate made by Shin-Nakamura Chemical Industrial Co., Ltd.) was placed in a flask equipped with a stirrer, a reflux condenser, a nitrogen-introducing tube, a thermometer and a dropping funnel, and, while a nitrogen gas was slowly flowed, the mixture was heated to 80° C. A mixed liquid, which had been prepared by mixing 8 parts of methacrylic acid, 8 parts of 2-ethylhexyl methacrylate, 3 parts of cyclohexyl methacrylate and 1 part of benzoyl peroxide, was dropwise added into the flask over a period of 3 hours. During the reaction, a nitrogen gas was continuously introduced into the flask and its internal temperature was kept at 80°±1° C. After the completion of the dropwise addition, the internal temperature was raised to 90° C. and the contents of the flask was stirred for 2 hours. Then, 25 parts of butanol was added, and a mixed solution of 300 parts of deionized water and 6 parts of 28% aqueous ammonia was dropwise added over a period of 1 hour, whereby a dispersion was obtained. Then, the solvents were removed from the resulting dispersion by vacuum distillation, whereby a water dispersion (A-1) of a polymer (A1), having a nonvolatile content of 25.3%, was obtained. The acid value of the polymer (A1) contained in the water dispersion (A-1) was 18 mgKOH/g.

PRODUCTION EXAMPLE 2

A Production Example for Water Dispersion of Polymer(A1)

Thirty-five parts of deionized water and 5 parts of Pelex OTP (an anionic surfactant made by Kao Corporation) were added into a mixed solution of 50 parts of "Superchlon 106L" (a polypropylene chloride resin made by Sanyo-Kokusaku Pulp Co., Ltd.; chlorine content 66%), 10 parts of methyl methacrylate, 39 parts of butyl acrylate and 1 part of acrylic acid, and the resulting mixture was treated with a homogenizer (BM-4 model made by Nihonseiki Kaisha Ltd.) at 18,000 rpm for 30 minutes, whereby a monomer emulsion was obtained.

Two hundred parts of deionized water was placed in a flask equipped with a stirrer, a reflux condenser, a nitrogen-introducing tube, a thermometer and a dropping funnel. While a nitrogen gas was slowly flowed, the deionized water was heated to 80° C. A mixture of 140 parts of the previously prepared monomer emulsion and 0.5 parts of tertiary-butyl peroxy(2-ethyl hexanoate) was dropwise added into the flask over a period of 3 hours. During the reaction, a nitrogen gas was continuously introduced into the flask and its internal temperature was kept at 80°±1° C. After the completion of the dropwise addition, the contents of the flask was further stirred at 80° C. for 2 hours, whereby the reaction was completed. Then, the reaction mixture was cooled and its pH was adjusted to 8.0 using an appropriate amount of ammonia, whereby a water dispersion (A-2) of a polymer (A1), having a nonvolatile content of 29.3%, was obtained. The acid value of the polymer (A1) contained in the water dispersion (A-2) was 8 mgKOH/g.

PRODUCTION EXAMPLE 3

A Production Example for Water Dispersion of Polymer (A2)

A mixture of 200 parts of toluene and 100 parts of "Califlex TR1107" (a hydrogenated styrene-isoprene copolymer made by Shell Japan)was placed in an autoclave equipped with a stirrer, and the mixture was heated to 150° C. Then, a liquid mixture of 10 parts of 2-hydroxypropyl acrylate and 2.5 parts of tertiary-butyl peroxy(2-ethyl hexanoate) was dropwise added over a period of 3 hours. After the completion of the dropwise addition, the contents of the autoclave was further stirred for 2 hours. After the completion of the reaction, the resultant modified styrene-isoprene copolymer was purified and isolated. Then, a mixed solution including 35 parts of the above-obtained modified styrene-isoprene copolymer, 35 parts of "Superchlon CR-5" (rubber chloride made by anyo-Kokusaku Pulp Co., Ltd.; chlorine content 66%) and 280 parts of toluene was added to a mixed solution beforehand prepared and including 280 parts of deionized water, 1 part of sodium dodecylbenzenesulfonate and 5 parts of Demol SN-B (a sodium salt of an aromatic sulfonic acid-formalin-condensed product, made by Kao Corporation), and the resultant mixture was treated with a homogenizer (BM-4 model made by Nihonseiki Kaisha Ltd.) at 18,000 rpm for 30 minutes, whereby a dispersion was obtained. Then, solvents was removed from the dispersion by vacuum distillation, whereby a water dispersion (A-3) of a polymer (A2), having a nonvolatile content of 22.1%, was obtained.

PRODUCTION EXAMPLE 4

A Production Example for Water Dispersion of Polymer (B) Having Oxazoline Group

A mixture of 782.4 parts of deionized water and 128 parts of a 15% aqueous solution of Hitenol N-08 (made by Dai-ichi Kogyo Seiyaku Co., Ltd.) as emulsifier was placed in a flask equipped with a stirrer, a reflux condenser, a nitrogen-introducing tube, a thermometer and a dropping funnel, and the pH of the mixture was adjusted to 9.0 with an appropriate amount of 28% aqueous ammonia. Then, while a nitrogen gas was slowly flowed, the mixture was heated to 70° C. Sixty-four parts of a 5% aqeous solution of potassium persulfate was injected into the flask, and then a previously prepared monomer mixture of 330 parts of butyl acrylate, 246 parts of styrene and 64 parts of 2-isopropenyl-2-oxazoline was dropwise added into the flask over a period of 3 hours. During the reaction, a nitrogen gas was continuously introduced into the flask and its internal temperature was kept at 70°±1° C. After the completion of the dropwise addition, the internal temperature was raised to 80° C., and the contents of the flask was further stirred for 1 hour, whereby the reaction was completed. Then, the reaction mixture was cooled and its pH was adjusted to 8.0 by adding an appropriate amount of 28% aqueous ammonia, whereby a water dispersion (B-1) of a polymer (B) with an oxazoline group, having a nonvolathe content of 39.8%, was obtained.

PRODUCTION EXAMPLE 5

A Production Example for Water Dispersion of Polymer (B) Having Oxazoline Group

The procedure of Production Example 3 was repeated except that the composition of the polymerizable toohomer mixture was changed to that having 100 parts of methyl methacrylate, 20 parts of ethyl acrylate, 96 parts of butyl methacrylate, 200 parts of 2-ethylhexyl acrylate, 150 parts of cyclohexyl methacrylate, 10 parts of acrylonitrile and 32 parts of 2-isopropenyl-2-oxazoline; whereby a water dispersion (B-2) of a polymer (B) with an oxazoline group, having a nonvolatile content of 39.9%, was obtained.

EXAMPLES 1 TO 7 AND COMPARATIVE EXAMPLES 1 TO 3

Aqueous resin compositions (1) to (7), according to the present invention, and comparative aqueous resin compositions (8) to (10) were prepared by mixing the water dispersions (A-1) and (A-2) of the polymers (A1) and the water dispersion (A-3) of the polymer (A2) with the water dispersions (B-1) and (B-2) of the polymers (B) having an oxazoline group and, if need be, also with aqueous resins (C-1) and (C-2), in accordance with the formulation shown in Table 1, wherein the aqueous resins (C-1) and (C-2) in Table 1 were "Acryset 210E" (an acrylic emulsion with a carboxyl group, made by Nippon Shokubai Co., Ltd. and having a nonvolatile content of 50% ) and "NeoRez R960" (an aqueous urethane made by Zeneca Resins Co., Ltd. and having a nonvolatile content of 33%) respectively.

counted, and this number was defined as the index of the adhesion.

The number of checkerboard squares which were not peeled off: ⊚: (100), ○:(80 to 99), ∆:(60 to 79), X:(59 or less)

(2) Water-Resistant Adhesion (Water Resistance)

The test samples were immersed in deionized water at 30° C. for 7 days and then subjected to the above-mentioned adhesion test.

(3) Solvent Resistance

TABLE 1

|  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Aqueous resin composition | (1) | (2) | (3) | (4) | (5) | (6) | (7) | (8) | (9) | (10) |
| Water dispersion (A-1) | 100 | 100 | 100 | — | — | 40 | — | 100 | — | — |
| Water dispersion (A-2) | — | — | — | 100 | 100 | — | — | — | 100 | — |
| Water dispersion (A-3) | — | — | — | — | — | — | 40 | — | — | 40 |
| Water dispersion (B-1) | 12 | 24 | — | 15 | — | 20 | 20 | — | — | — |
| Water dispersion (B-2) | — | — | 24 | — | 15 | — | — | — | — | — |
| Aqueous resin (C-1) | — | — | — | — | — | 40 | 40 | — | — | 40 |
| Aqueous resin (C-2) | — | — | — | — | — | 10 | 10 | — | — | 10 |

The following physical properties were measured using the aqueous resin compositions (1) to (7) and the comparative aqueous resin compositions (8) to (10) which compositions were shown in Table 1. Their results are shown in Table 2.

Physical Properties of Coating Films

Films of about 60μ in dry thickness of the above-mentioned aqueous resin compositions were coated on polypropylene plates having a surface washed with isopropanol, and the films were forcibly dried at 120° C. for 30 minutes, whereby test samples were obtained. These test samples were subjected to the following tests. Results are shown in Table 2

(1) Adhesion

In accordance with a checkerboard square test method particularized in JIS K5400, checkerboard squares were formed on the test samples to carry out a cellophane tape peeling test. The number of checkerboard squares, which were not peeled off, per 100 checkerboard squares was The surface of the test samples was rubbed 50 times with degreased cotton into which methyl ethyl ketone was permeated, and then the surface condition of the samples was observed.

⊚: No change; ○: slight scratches were formed; ∆: apparent scratches were formed; X: film was dissolved or peeled off.

TABLE 2

|  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Aqueous resin composition | (1) | (2) | (3) | (4) | (5) | (6) | (7) | (8) | (9) | (10) |
| Adhesion | ⊚ | ⊚ | ⊚ | ⊚ | ⊚ | ⊚ | ⊚ | ○ | ○ | ○ |
| Water-resistant adhesion | ⊚ | ⊚ | ⊚ | ⊚ | ⊚ | ⊚ | ⊚ | X | ∆ | X |
| Solvent resistance | ⊚ | ⊚ | ⊚ | ⊚ | ⊚ | ⊚ | ○ | ∆ | ∆ | X |

It is apparent from Table 2 that the aqueous resin compositions, according to embodiments of the present invention, can form films which have excellent adhesion, water resistance and solvent resistance. Those of Comparative Examples 1, 2 and 3 are inferior in any of the adhesion, the water resistance and the solvent resistance, because they do not contain a polymer having an oxazoline group.

INDUSTRIAL APPLICATION

Since the aqueous resin composition of the present invention includes a polymer and an aqueous medium, and since the polymer at least partially includes a polyolefin chloride resin and has a carboxyl group and an oxazoline group, this aqueous resin composition can form coating films which have excellent adhesion with substrates, especially with polyolefin and the like, and excellent water resistance and solvent resistance. So this composition can favorably be used for coatings, primers, adhesives, printing ink, and the like.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. An aqueous resin composition comprising:

an aqueous medium;

a polymer (A1) at least partially comprising a polyolefin chloride resin and having a carboxyl group, wherein said polyolefin chloride resin is obtained by chloridizing a polyolefin; and a polymer (B) having an oxazoline group.

2. An aqueous resin composition as in claim 1, wherein the ratio by weight of said polymer (A1) having a carboxyl group to the polymer (B) having an oxazoline group, (A1)/(B), is in a range of 0.2 to 50.

3. An aqueous resin composition as in claim 1, wherein the acid value of said polymer having a carboxyl group is in a range of 5 to 200 mgKOH/g.

4. An aqueous resin composition as in claim 1, wherein the content of said polyolefin chloride resin in said polymer (A1) is in a range of 10 to 100% by weight.

5. An aqueous resin composition as in claim 1, wherein said polymer (B) having an oxazoline group is a copolymer obtained by copolymerizing an addition-polymerizable oxazoline and a vinyl monomer, wherein the copolymerization ratio of the addition-polymerizable oxazoline is not less than 0.5% by weight, but less than 50% by weight.

6. The aqueous resin composition as in claim 1, which is formed into a coating film by coating on a substrate including a polyolefin resin.

7. The aqueous resin composition of claim 1, wherein said polyolefin is selected from the group consisting of polyethylene, polypropylene, ethylene-propylene copolymers, ethylene-propylene-diene copolymers, polybutene, ethylene-vinyl acetate copolymers, styrene-butadiene copolymers, styrene-isoprene copolymers, natural rubber, and olefin rubber.

* * * * *